US011218561B1

(12) United States Patent
Mondal et al.

(10) Patent No.: US 11,218,561 B1
(45) Date of Patent: Jan. 4, 2022

(54) METHOD AND SYSTEM FOR MANAGING CACHE DATA IN A NETWORK THROUGH EDGE NODES

(71) Applicant: Wipro Limited, Bangalore (IN)

(72) Inventors: Subhas Chandra Mondal, Bangalore (IN); Shailesh Prabhu, Manipal (IN); Aniket De, Vadodara (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/241,143

(22) Filed: Apr. 27, 2021

(30) Foreign Application Priority Data

Mar. 9, 2021 (IN) .............................. 202141009860

(51) Int. Cl.
*H04L 29/08* (2006.01)
*H04L 12/24* (2006.01)

(52) U.S. Cl.
CPC .......... *H04L 67/2842* (2013.01); *H04L 41/12* (2013.01)

(58) Field of Classification Search
CPC ........................ H04L 67/2842–67/2852; H04L 41/12–41/147
See application file for complete search history.

(56) References Cited

U.S. PATENT DOCUMENTS

| 8,438,215 B2 | 5/2013 | Fujihira et al. |
| 8,665,757 B2 | 3/2014 | Kling et al. |
| 9,537,719 B2 | 1/2017 | Mahadevan et al. |
| 9,582,603 B1 * | 2/2017 | Acharya ................. H04L 67/42 |
| 9,729,662 B2 | 8/2017 | Mahadevan et al. |
| 10,135,948 B2 | 11/2018 | Mosko et al. |
| 10,230,684 B2 | 3/2019 | Zheng |
| 10,346,303 B1 | 7/2019 | Abrahms |
| 2004/0249965 A1 | 12/2004 | Huggins et al. |

(Continued)

FOREIGN PATENT DOCUMENTS

| CN | 102387169 B | 7/2014 |
| EP | 2765744 B1 | 11/2017 |

OTHER PUBLICATIONS

Lincan Li et al., "A Proactive Mobile Edge Cache Policy Based on the Prediction by Partial Matching", 2020, Advances in Science, Technology and Engineering Systems Journal, vol. 5, No. 5, pp. 1154-1161 (Year: 2020).*

(Continued)

*Primary Examiner* — Clayton R Williams
(74) *Attorney, Agent, or Firm* — Finnegan, Henderson, Farabow, Garrett & Dunner, LLP

(57) ABSTRACT

This disclosure relates to system and method for managing cache data in a network through edge nodes. The method includes receiving set of first node parameters, set of Mobile Edge Computing (MEC) node association metrics, and set of data request parameters from the user device; identifying a variation in at least one of the set of first node parameters, the set of MEC node association metrics, and the set of data request parameters; selecting a second edge node from the plurality of edge nodes to store the cache data based on a set of second node parameters, the set of MEC node association metrics, and the set of data request parameters, when variation is above predefined threshold; associating the second edge node with the user device to store the cache data for the user device; and dynamically managing cache data for the user device in the second edge node.

20 Claims, 12 Drawing Sheets

(56) References Cited

U.S. PATENT DOCUMENTS

| | | | |
|---|---|---|---|
| 2005/0165828 A1 | 7/2005 | Lango et al. | |
| 2015/0245160 A1* | 8/2015 | Agrawal | H04L 67/1004 |
| | | | 455/406 |
| 2016/0248704 A1* | 8/2016 | Soelberg | H04L 47/522 |
| 2016/0294956 A1* | 10/2016 | Fix | H04L 41/147 |
| 2018/0359335 A1 | 12/2018 | Du et al. | |
| 2021/0136178 A1* | 5/2021 | Casey | G06F 9/5072 |
| 2021/0203630 A1* | 7/2021 | Johns | H04L 67/1002 |

OTHER PUBLICATIONS

Shasha Tian et al., "Spatio-temporal Position Prediction Model for Mobile Users Based on LSTM", 2019, IEEE 25th International Conference on Parallel and Distributed Systems (ICPADS), pp. 967-970 (Year: 2019).*

Li, X., et al., "Hierarchial Edge Caching in Device-to-Device Aided Mobile Networks: Modeling, Optimization, and Design", IEEE Journal of Selected Areas in Communications, Aug. 2018, vol. 36, No. 8, pp. 1768-1785.

Zhang, X., et al., "Collaborative Hierarchical Caching Over 5G Edge Computing Mobile Wireless Networks", 2018 IEEE, 6 pages.

Zhang, K. et al., Cooperative Content Caching in 5G Networks with Mobile Edge Computing, 2018 IEEE, 8 pages.

Wei, H. et al., "Mobility-Aware Service Caching in Mobile Edge Computing for Internet of Things", Sensors 2020, 20, 610, pp. 1-20.

\* cited by examiner

| Number of Users Associated 901 | Number of hops 902 | Node Occupancy (Mbps) 903 | RTT (ms) 904 | Optimal Edge Node for Caching (Node ID) 905 |
|---|---|---|---|---|
| 50 | 2 | 70 | 20 | Node 1 |
| 20 | 1 | 10 | 10 | Node 2 |

METHOD AND SYSTEM FOR MANAGING CACHE DATA IN A NETWORK THROUGH EDGE NODES

TECHNICAL FIELD

This disclosure relates generally to 5G edge networks, and more particularly to system and method for managing cache data in a network through edge nodes.

BACKGROUND

With introduction of network programmability in 5G, realization of industrial use cases has become more efficient. Enhanced Mobile Broadband feature of 5G promises to enable a more video streaming applications such as, cloud gaming, remote control, and 4K/8K video streaming in planar display or AR/VR devices. To reduce latency and backhaul congestion for latency-sensitive and bandwidth hungry applications, 5G natively supports edge computing, which facilitates content caching in proximity of the user.

While there are multiple solutions and architectures available for hierarchical content caching in present state of art, existing systems and methods lack a mechanism to decide the most optimal edge node to host the content cache based on user density and location affinity. While it is not always the best option to cache the content at the nearest edge node due to the unpredictable association pattern of the users, coming up with a cognitive decision to find the most optimal node adapting to the dynamic occupancy level and association pattern of users is a difficult problem to solve. Further, when there is a large number of user requests to consume a video content, taking a decision as to where to cache the content, based on the user distribution remains a key challenge.

There is, therefore, a need in the present state of art for novel approaches to manage cache data and user requests over a network through edge nodes and cognitive models.

SUMMARY

In one embodiment, a method for managing cache data in a network through edge nodes is disclosed. In one example, the method includes receiving a set of first node parameters corresponding to a first edge node from a plurality of edge nodes in the network, a set of Mobile Edge Computing (MEC) node association metrics corresponding to a user device, and a set of data request parameters from the user device. The first edge node is associated with the user device to store the cache data for the user device. The method further includes identifying a variation in at least one of the set of first node parameters corresponding to a first edge node, the set of MEC node association metrics corresponding to a user device, and the set of data request parameters from the user device. The method further includes selecting a second edge node from the plurality of edge nodes to store the cache data based on a set of second node parameters corresponding to the second edge node, the set of MEC node association metrics, and the set of data request parameters, when the variation is above a predefined threshold. The method further includes associating the selected second edge node with the user device to store the cache data for the user device. The second edge node is initiated with the cache data when the cache data is absent in the second edge node prior to the associating. The method further includes dynamically managing the cache data for the user device in the associated second edge node.

In one embodiment, a system for managing cache data in a network through edge nodes is disclosed. In one example, the system includes a processor and a computer-readable medium communicatively coupled to the processor. The computer-readable medium may store processor-executable instructions, which, on execution, may cause the processor to receive a set of first node parameters corresponding to a first edge node from a plurality of edge nodes in the network, a set of Mobile Edge Computing (MEC) node association metrics corresponding to a user device, and a set of data request parameters from the user device. The first edge node is associated with the user device to store the cache data for the user device. The processor-executable instructions, on execution, may further cause the processor to identify a variation in at least one of the set of first node parameters corresponding to a first edge node, the set of MEC node association metrics corresponding to a user device, and the set of data request parameters from the user device. The processor-executable instructions, on execution, may further cause the processor to select a second edge node from the plurality of edge nodes to store the cache data based on a set of second node parameters corresponding to the second edge node, the set of MEC node association metrics, and the set of data request parameters, when the variation is above a predefined threshold. The processor-executable instructions, on execution, may further cause the processor to associate the selected second edge node with the user device to store the cache data for the user device. The second edge node is initiated with the cache data when the cache data is absent in the second edge node prior to the associating. The processor-executable instructions, on execution, may further cause the processor to dynamically manage the cache data for the user device in the associated second edge node.

In one embodiment, a non-transitory computer-readable medium storing computer-executable instructions for identifying common requirements from applications is disclosed. In one example, the stored instructions, when executed by a processor, cause the processor to perform operations including receiving a set of first node parameters corresponding to a first edge node from a plurality of edge nodes in the network, a set of Mobile Edge Computing (MEC) node association metrics corresponding to a user device, and a set of data request parameters from the user device. The first edge node is associated with the user device to store the cache data for the user device. The operations further include identifying a variation in at least one of the set of first node parameters corresponding to a first edge node, the set of MEC node association metrics corresponding to a user device, and the set of data request parameters from the user device. The operations further include selecting a second edge node from the plurality of edge nodes to store the cache data based on a set of second node parameters corresponding to the second edge node, the set of MEC node association metrics, and the set of data request parameters, when the variation is above a predefined threshold. The operations further include associating the selected second edge node with the user device to store the cache data for the user device. The second edge node is initiated with the cache data when the cache data is absent in the second edge node prior to the associating. The operations further include dynamically managing the cache data for the user device in the associated second edge node.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
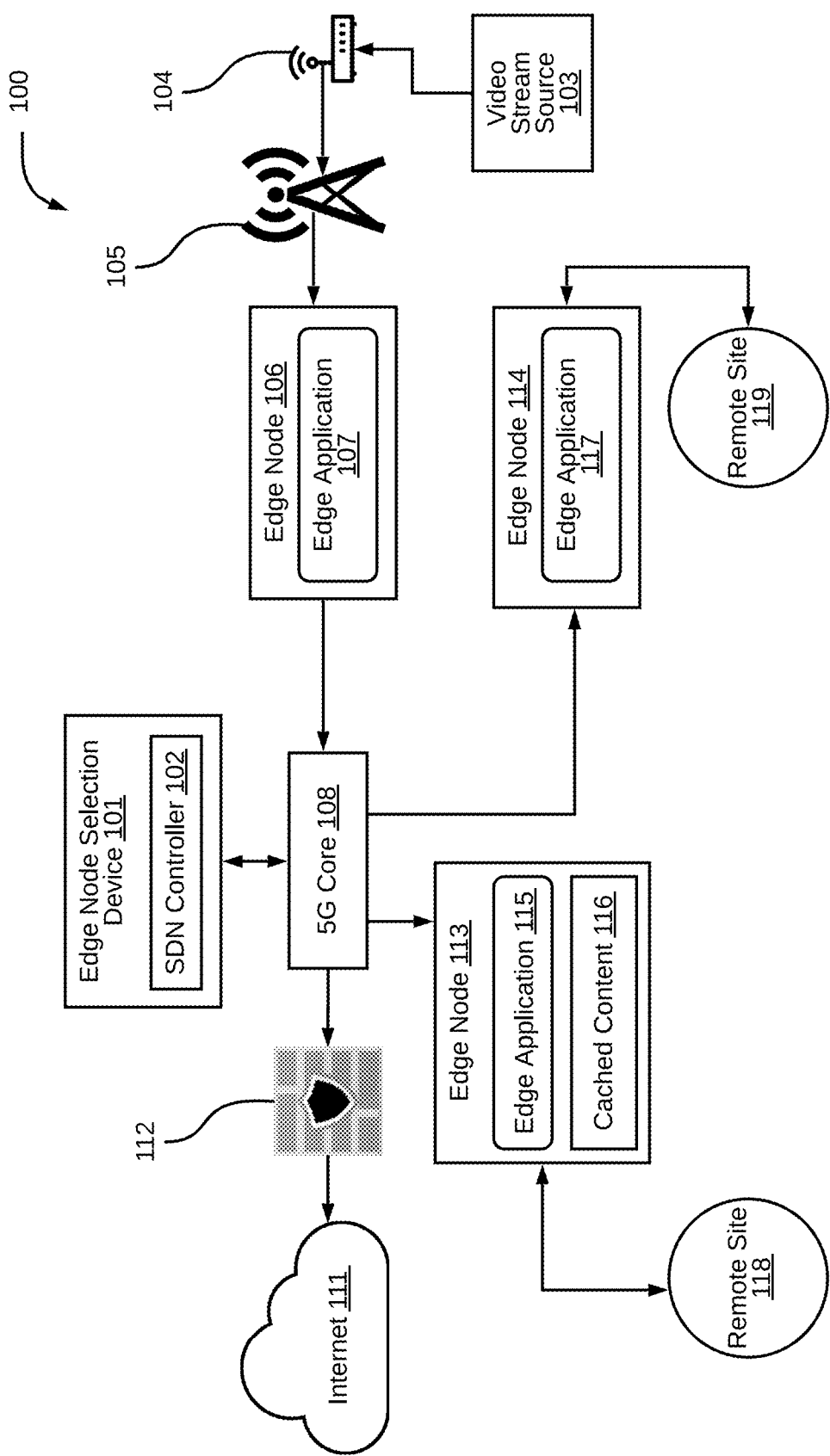
FIG. 1 illustrates an exemplary system for managing cache data in a network through edge nodes, in accordance with some embodiments of the present disclosure.

Referring now to FIG. 1, an exemplary system 100 for managing cache data in a network through edge nodes is illustrated, in accordance with some embodiments of the present disclosure. The system 100 includes an edge node selection device 101. The edge node selection device includes a Software Defined Network (SDN) controller 102. In an embodiment, a video stream source 103 shares video data (for example, a 360° video data, a planar video data, etc.) with a 5G CPE 104. It may be noted that the system may be implemented over a 5G network or any other network by using a network-compatible infrastructure. Further, the 5G CPE 104 transmits the video data to a base station 105. The base station 105 transmits the video data to an edge node 106. The edge node 106 includes an edge application 107. Further, the edge node 106 transmits the video data to a 5G core 108. The 5G core 108 interacts with the edge node selection device 101. The 5G core 108 transmits the video data to internet 111 through a firewall 112. Further, the 5G core 108 transmits the video data to an edge node 113 and an edge node 114. The edge node 113 includes an edge application 115 and a cached content 116. The edge node 114 includes an edge application 117. Further, the edge node 113 shares the video data with user devices located at a remote site 118 and the edge node 114 shares the video data with user devices located at a remote site 119.

In an exemplary scenario, a 360° video is streamed from the video stream source 103 across a 5G network. The content is archived at edge node 113 based on frequency of user requests to consume the video. Further, the remote site 118 may include 10 user requests and a low node occupancy and the remote site 119 may include 150 user requests and a high node occupancy. Further, the SDN Controller 102 and an edge node selection block (not shown in figure) determines whether the video content is required to be cached at the edge node 114, or whether the users in the remote site 119 may be routed to consume the cache from the edge node 106. Since the node occupancy and number of users associated with the edge node 114 are higher compared to that of the edge node 113, the users from the remote site 119 consume the content from the cached content 116 present in the edge node 113. It may be noted that the edge node 113 is one hop away from the remote site 119. Therefore, the user experience is retained.

As will be described in greater detail in conjunction with FIGS. 2-14, the edge node selection device 101 may receive a set of first node parameters corresponding to a first edge node from a plurality of edge nodes in the network, a set of Mobile Edge Computing (MEC) node association metrics corresponding to a user device, and a set of data request parameters from the user device. The first edge node is associated with the user device to store the cache data for the user device. Further, the edge node selection device 101 may identify a variation in at least one of the set of first node parameters corresponding to a first edge node, the set of MEC node association metrics corresponding to a user device, and the set of data request parameters from the user device. Further, the edge node selection device 101 may select a second edge node from the plurality of edge nodes to store the cache data based on a set of second node parameters corresponding to the second edge node, the set of MEC node association metrics, and the set of data request parameters, when the variation is above a predefined threshold. Further, the edge node selection device 101 may associate the selected second edge node with the user device to store the cache data for the user device. The second edge node is initiated with the cache data when the cache data is absent in the second edge node prior to the associating. Further, the edge node selection device 101 may dynamically managing the cache data for the user device in the associated second edge node.

In some embodiments, the requirements identification device 102, the edge node 106, the 5G core 108, the edge node 113, and the edge node 114 may include one or more processors (not shown in figure) and a computer-readable medium (for example, a memory). The computer-readable medium may include a plurality of requirements corresponding to a plurality of applications. Further, the computer-readable storage medium may store instructions that, when executed by the one or more processors, cause the one or more processors to manage cache data in a network through edge nodes, in accordance with aspects of the present disclosure. The computer-readable storage medium may also store various data (for example, cache data, MEC node association metrics, node occupancy data, set of data request parameters, and the like) that may be captured, processed, and/or required by the system 100.

Figure 2:
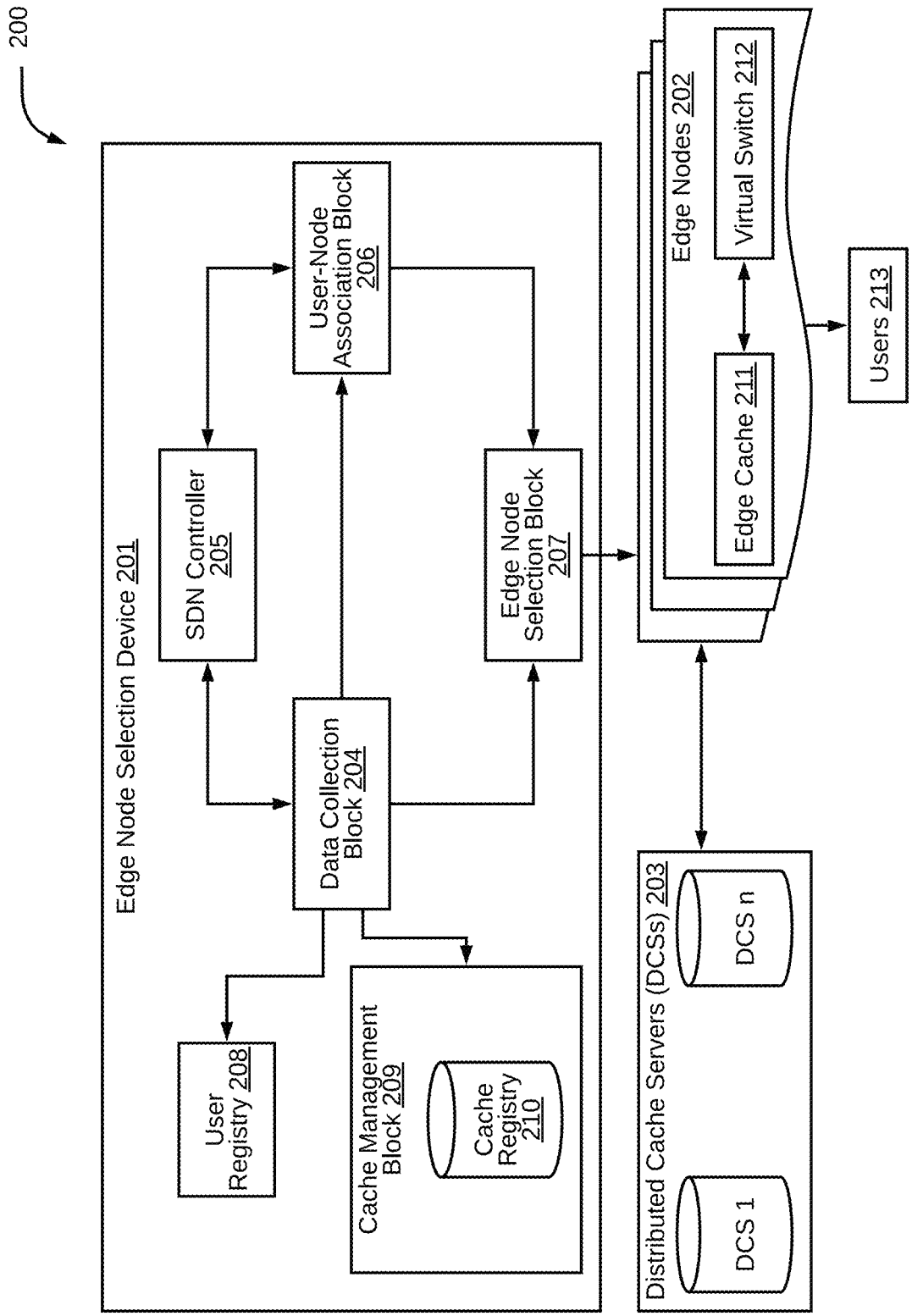
FIG. 2 is a functional block diagram of an exemplary system for managing cache data in a network through edge nodes, in accordance with some embodiments of the present disclosure.

Referring now to FIG. 2, a functional block diagram of an exemplary system 200 for managing cache data in a network through edge nodes is illustrated, in accordance with some embodiments of the present disclosure. The system 200 may include an edge node selection device 201, edge nodes 202 (for example the edge node 113 and the edge node 114), and Distributed Cache Servers (DCSs) 203. The edge node selection device 201 may be analogous to the edge node selection device 101 of the system 100. The edge node selection device 201 includes a data collection block 204, an SDN controller 205, a user-node association block 206, an edge node selection block 207, a user registry 208, and a cache management block 209. The cache management block 209 further includes a cache registry 210.

The SDN controller 205 federates location of the edge nodes 202. Further, the SDN controller 205 discovers the edge nodes 202 and users 213 connected to the edge nodes 202 dynamically in the network through the data collection block 204. Further, the SDN controller 205 determines an edge node occupancy and a number of edge devices connected to an edge node at an instance of time based on the information received from the data collection block 204. The SDN controller 205 stores real-time node association information of each of the users 213. Further, the SDN controller 205 sends real-time node association information to the user node association block 206.

The data collection block 204 is connected to the user registry 208, the cache management block 209, the SDN controller 205, the user-node association block 206, and the edge node selection block 207. The data collection block 204 receives user related parameters from the user registry 208. Additionally, the data collection block 204 receives network and location related parameters from the SDN controller 205 using network management Application Programming Interfaces (APIs). By way of an example, the network and location related parameters may include, but may not be limited to, node occupancy, number of users per node, transport link latency, transport link jitter, application priority, packet processing node delay, and the like. The data collection block 204 shares the network and location related parameters to the edge node selection block 207 to predict an optimal edge node for content caching. In some embodiments, the data collection block 204 shares the network and location related parameters to the user-node association block 206 to track the node association of the users 213.

The edge node selection block 207 receives user, network and location related parameters from the data collection block 204. Additionally, the edge node selection block 207 receives user-node association parameters of the users 213 from the user-node association block 206. The edge node selection block 207 identifies a requirement for an optimal edge node for content caching. Further, the edge node selection block 207 identifies the optimal edge node and initiates caching content at the optimal edge node. In some embodiments, the edge node selection block 207 utilizes learning algorithms (such as Machine Learning (ML), Deep Learning (DL), or Artificial Intelligence (AI)-based learning algorithms) to identify the optimal edge node for caching the content. Further, while identifying the optimal edge node, the edge node selection block 207 predicts a time/location-based demand of the content to be cached and predicts a future location of the users 213 to apply cognitive decisions on optimal edge node selection. Further, the edge node selection block 207 utilizes data stored in the data collection block 204 for training and inference purposes to predict the optimal edge node. Further, the edge node selection block 207 sends a control signal to the optimal edge node. It may be noted that the control signal includes the content to be cached with the location of the DCSs 203 (for example, DCS1 or DCSn) from which the content may be cached.

The user-node association block 206 receives real-time node association information of the users 213 from the SDN controller 205. The user-node association block 206 fetches information regarding the users 213, the network and location related parameters from the data collection block 204. Further, the user-node association block 206 tracks association of the users 213 to the edge nodes 202 from a serving edge node to another edge node. Each of the edge nodes 202 is under control of the SDN controller 205. Further, when a user device is handed over from the serving edge node to another edge node, the user-node association block 206 notifies the edge node selection block 207 to either route a user to a nearest available cache location or initiate content cache in a newly associated node.

The cache management block 209 performs a dynamic cache management. Based on a Time-to-Live (TTL) and demand for a content, the cache management block 209 performs the cache deletion/replacement. Further, when an amendment is made to a previously cached content, the cache management block 209 updates the previously cached content with updated content. The cache management block 209 stores a record of edge nodes 202 where the content is currently cached within the cache registry 210. When there is a user request for a service content, the SDN controller 205 fetches the cache locations from the cache registry 210. Further, the SDN controller 205 takes a decision to route based on an output from the edge node selection block 207.

The user registry 208 is used to keep a record of user information such as Media Access Control (MAC) address, International Mobile Equipment Identity (IMEI) number, International Mobile Subscriber Identity (IMSI), Internet Protocol (IP) address, associated edge node, etc. When a user moves from one edge node to another edge node, the user registry 208 is updated with the new association.

The edge nodes 202 include edge cache 211 and a virtual switch 212. The virtual switch 212 captures packets from the users 213 and forwards user requests to the DCSs 203 via the SDN controller 205. Additionally, the virtual switch 212 communicates with the SDN Controller 205 using a communication protocol (for example, OpenFlow). The virtual switch 212 plays a critical role in flow management of user traffic and data extraction.

It should be noted that all such aforementioned modules 202-212 may be represented as a single module or a combination of different modules. Further, as will be appreciated by those skilled in the art, each of the modules 202-212 may reside, in whole or in parts, on one device or multiple devices in communication with each other. In some embodiments, each of the modules 202-212 may be implemented as a dedicated hardware circuit comprising a custom application-specific integrated circuit (ASIC) or gate arrays, off-the-shelf semiconductors such as logic chips, transistors, or other discrete components. Each of the modules 202-212 may also be implemented in an edge device such as a field programmable gate array (FPGA), programmable array logic, programmable logic device, and so forth. Alternatively, each of the modules 202-212 may be implemented in software for execution by various types of processors. An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing cache data in a network through edge nodes. For example, the exemplary system 200 may manage cache data in a network through edge nodes by the processes discussed herein. In particular, as will be appreciated by those of ordinary skill in the art, control logic and/or automated routines for performing the techniques and steps described herein may be implemented by the system 200 either by hardware, software, or combinations of hardware and software. For example, a suitable code may be accessed and executed by one or more processors on the system 200 to perform some or all of the techniques described herein. Similarly, application specific integrated circuits (ASICs) configured to perform some or all of the processes described herein may be included in the one or more processors on the system 200.

Figure 3A:
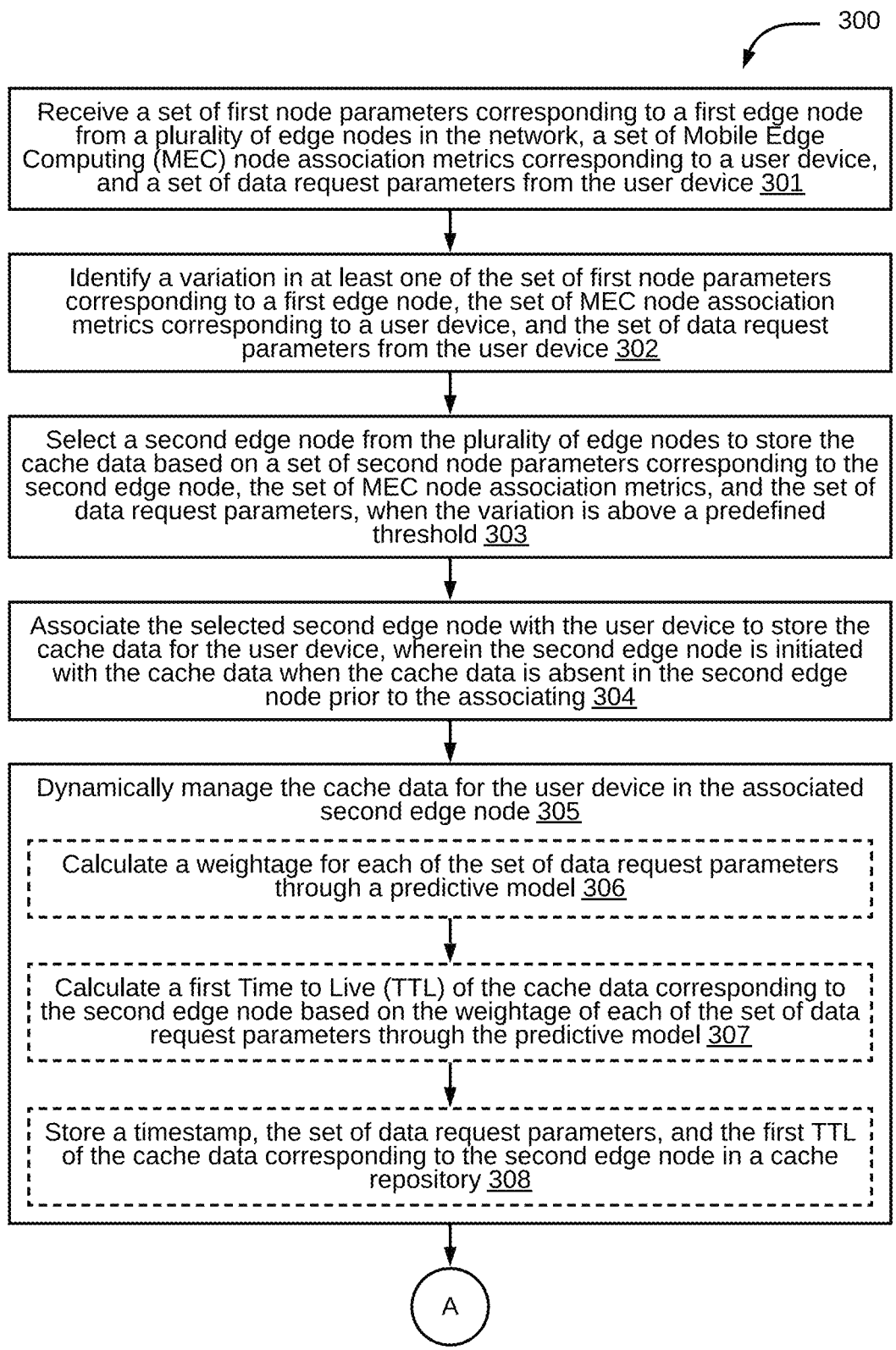
FIGS. 3A and 3B illustrate a flow diagram of an exemplary process for managing cache data in a network through edge nodes, in accordance with some embodiments of the present disclosure.
Figure 3B:
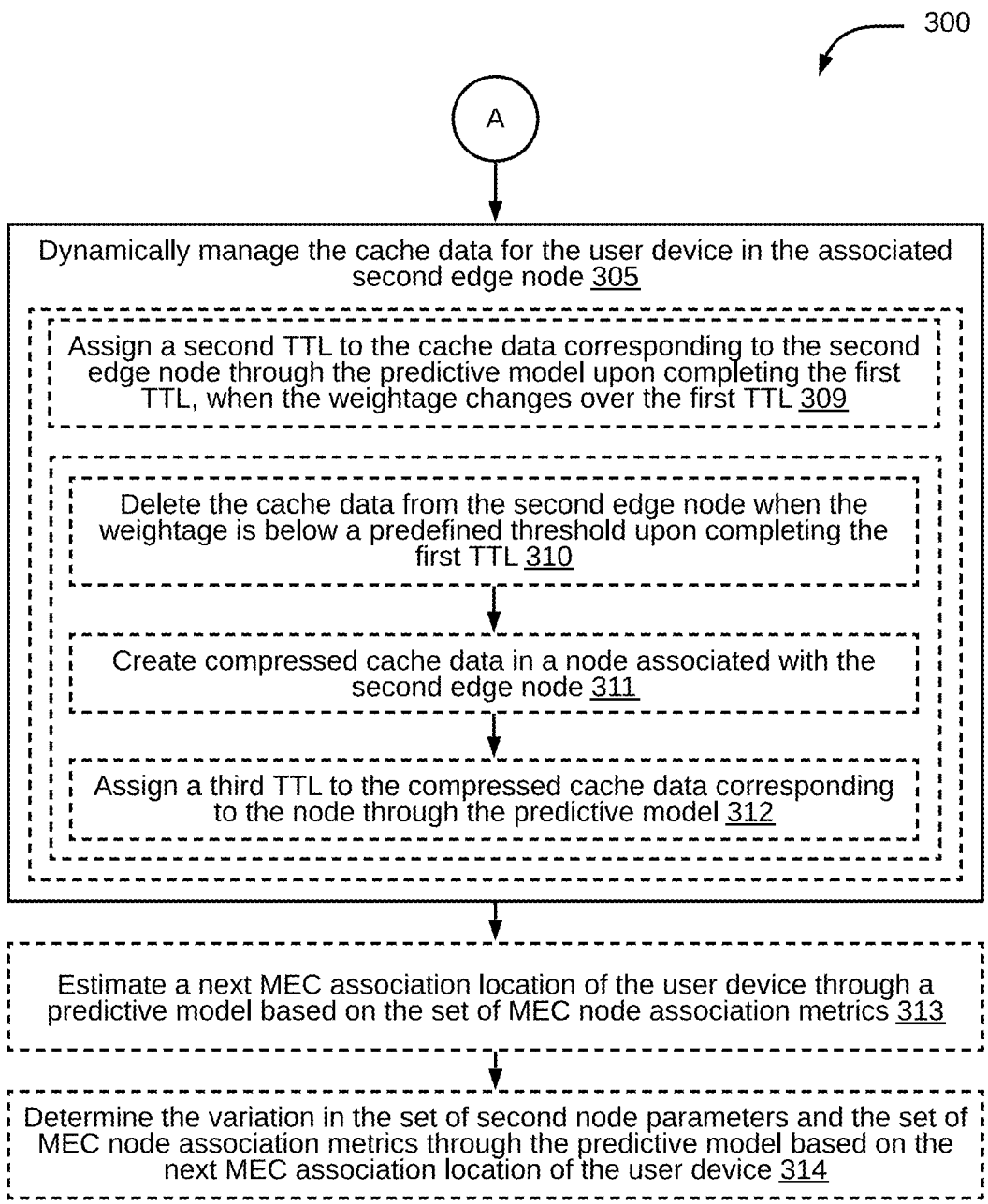

Referring now to FIGS. 3A and 3B, an exemplary process 300 for managing cache data in a network through edge nodes is depicted via a flow chart, in accordance with some embodiments. In an embodiment, the process 300 may be implemented by the system 100. The process 300 includes receiving a set of first node parameters corresponding to a first edge node (for example, the edge node 113) from a plurality of edge nodes in the network, a set of Mobile Edge Computing (MEC) node association metrics corresponding to a user device, and a set of data request parameters from the user device, at step 301. The first edge node is associated with the user device to store the cache data for the user device. Further, the process 300 includes identifying a variation in at least one of the set of first node parameters corresponding to a first edge node, the set of MEC node association metrics corresponding to a user device, and the set of data request parameters from the user device, at step 302.

Further, the process 300 includes selecting a second edge node (for example, the edge node 114) from the plurality of edge nodes to store the cache data based on a set of second node parameters corresponding to the second edge node, the set of MEC node association metrics, and the set of data request parameters, when the variation is above a predefined threshold, at step 303. It may be noted that the set of first node parameters and the set of second node parameters may include edge node occupancy, Hardware Resource Information (HRI) of a corresponding edge node, and a current location of the corresponding edge node. The set of MEC node association metrics may include a current location, historical location data, and the estimated next location corresponding to the user device. The set of data request parameters may include a Round Trip Time (RTT), a jitter, an interest factor, and a transport cost associated with a data request. By way of an example, the data collection block 204 provides the set of first node parameters associated with the edge node 113, the set of MEC node association metrics corresponding to a user device, and a set of data request parameters from the user device to the SDN controller 205. Upon identifying a change in at least one of the set of first node parameters, the set of MEC node association metrics, and a set of data request parameters, and when the change is above a predefined threshold, the SDN controller 205 and the edge node selection block 207 select the edge node 114 to store the cache data based on a set of second node parameters associated with the edge node 114, the set of MEC node association metrics, and the set of data request parameters.

Further, the process 300 includes associating the selected second edge node with the user device to store the cache data for the user device, at step 304. The second edge node is initiated with the cache data when the cache data is absent in the second edge node prior to the associating. Further, the process 300 includes dynamically managing the cache data for the user device in the associated second edge node, at step 305. Further, the process 300 includes calculating a weightage for each of the set of data request parameters through a predictive model, at step 306. The set of data request parameters includes an interest factor associated with the cache data of the second edge node, initial cache size, and number of edge locations storing the cache data. In continuation of the example above, the user-node association block 206 associates the edge node 114 with the user device. Further, the cache management block 209 initiates cache data in the edge node 114. Additionally, the cache management block 209 updates the cache registry 210 with new user node association parameters. Further, the cache data is dynamically managed by receiving data from the data collection block 204 and using the ML model of the edge node selection block 207 to manage user-node associations.

Further, the process 300 includes calculating a first Time to Live (TTL) of the cache data corresponding to the second edge node based on the weightage of each of the set of data request parameters through the predictive model, at step 307. Further, the process 300 includes storing a timestamp, the set of data request parameters, and the first TTL of the cache data corresponding to the second edge node in a cache repository, at step 308. Further, the process 300 includes assigning a second TTL to the cache data corresponding to the second edge node through the predictive model upon completing the first TTL, when the weightage changes over the first TTL, at step 309. The second TTL is lower than the first TTL when the weightage decreases over the first TTL. The second TTL is greater than the first TTL when the weightage increases over the first TTL.

Further, the process 300 includes deleting the cache data from the second edge node when the weightage is below a predefined threshold upon completing the first TTL, at step 310. Further, the process 300 includes creating compressed cache data in a node associated with the second edge node, wherein the node is one of the plurality of nodes, at step 311. Further, the process 300 includes assigning a third TTL to the compressed cache data corresponding to the node through the predictive model, at step 312. It may be noted that the process 300 includes one of the step 309 or the steps 310-312 based on the weightage of each of the set of data request parameters. In continuation of the example above, a TTL is calculated by the ML model for the cache data in the edge node 114. Further, upon expiry of the TTL, when a weightage corresponding to the user node association parameters is less than a predefined threshold, the cache data is deleted from the edge node 114. The cache data is moved in a compressed form to an upper tier node (such as, the DCS 203) and a shorter TTL is assigned to the compressed cache data. When the user-node association parameters is greater than the predefined threshold, the TTL is extended for the cache data in the edge node 114.

Further, the process 300 includes estimating a next MEC association location of the user device through a predictive model based on the set of MEC node association metrics, at step 313. Further, the process 300 includes determining the variation in the set of second node parameters and the set of MEC node association metrics through the predictive model based on the next MEC association location of the user device, at step 314.

Figure 4:
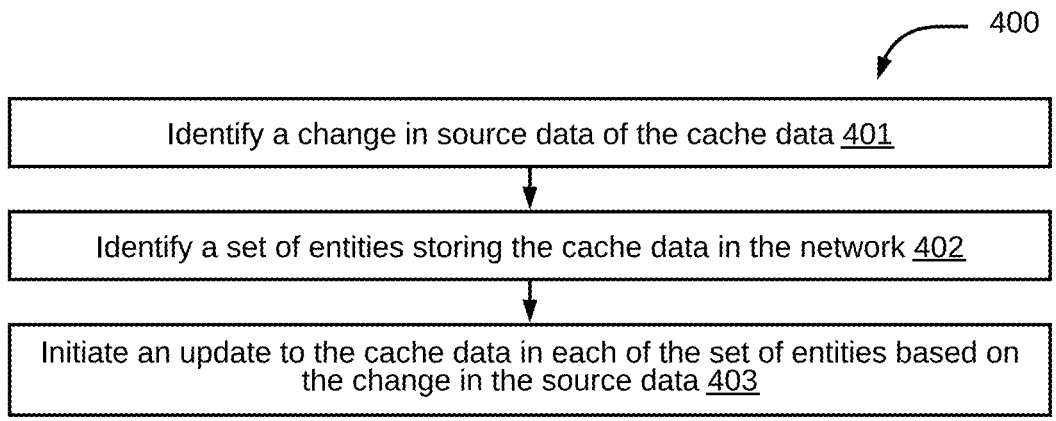
FIG. 4 illustrates a flow diagram of an exemplary process for updating cache data in each of a set of entities, in accordance with some embodiments of the present disclosure.

Referring now to FIG. 4, an exemplary process 400 for updating cache data in each of a set of entities is depicted via a flowchart, in accordance with some embodiments. The process 400 may be implemented by the system 100. The process 400 includes identifying a change in source data (for example, video content) of the cache data, at step 401. Further, the process 400 includes identifying a set of entities storing the cache data in the network, at step 402. The set of entities is a subset of the plurality of edge nodes, the plurality of nodes, the set of distributed cache servers, and the CDN origin server. Further, the process 400 includes initiating an update to the cache data in each of the set of entities based on the change in the source data, at step 403.

By way of an example, upon identifying a change in the source data, the cache management block 209 identifies each of the edge nodes 202 which include the cache data corresponding to the source data via the cache registry 210. Further, the cache management block 209 initiates an update to the cache data in each of the edge nodes 202 which include the cache data corresponding to the source data. Upon updating the cache data of the edge nodes 202, the cache management block 209 updates the cache registry 210. Further, the cache management block 209 monitors the cache registry 210 after a pre-defined time for updating the cache locations to provide the updated content to the edge user on request.

Figure 5:
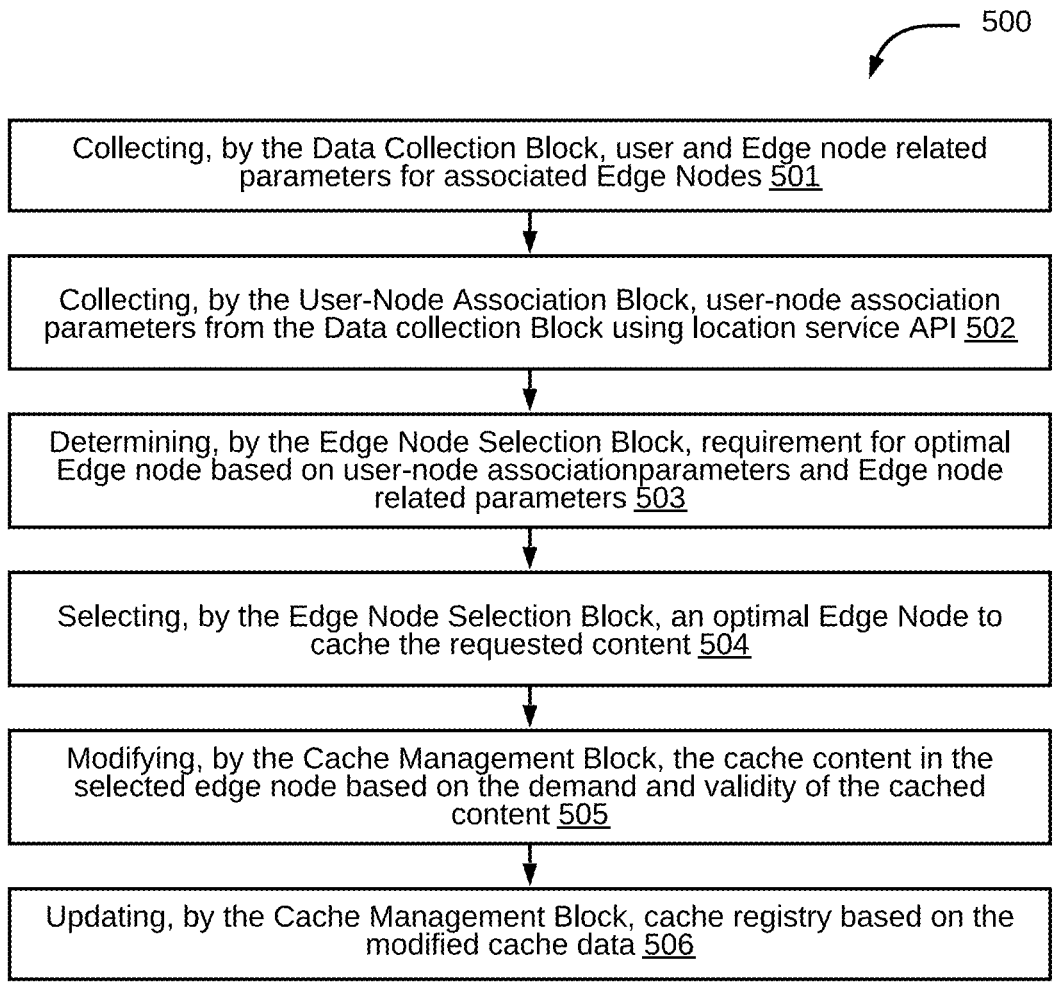
FIG. 5 illustrates a flow diagram of a detailed exemplary process for managing cache data in a network through edge nodes, in accordance with some embodiments of the present disclosure.

Referring now to FIG. 5, a detailed exemplary process 500 for managing cache data in a network through edge nodes is depicted via a flowchart, in accordance with some embodiments of the present disclosure. The process 500 includes collecting, by the data collection block 204, user and edge node related parameters for associated edge nodes, at step 501. The data collection block 204 collects user information (for example, identity, location, node association, etc.) from the user registry 208. Further, the data collection block collects cache related information (such as, cache ID, node ID of the cache, Time-to-Live of the cache, etc.) from the cache management block 209. The data collection block 204 collects the user, location and network related parameters associated to each of the edge nodes 202 leveraging network management APIs of the SDN controller 205. The user, location, and network related parameters collected may include a number of users connected, a transport cost, a node occupancy, Round Trip Time (RTT) and jitter, Hardware Resource Information (HRI), interest factor of requested content, and the like.

The SDN controller 205 dynamically determines the number of users connected by discovering the MAC addresses of the users 213 associated with the edge nodes 202. When new users keep associating with the edge nodes 202, the SDN controller 205 dynamically discovers association of the new users. Further, the SDN controller 205 dynamically determines the transport cost. When a user request is received for consuming a content (for example, a video content), the SDN controller 205, through the cache registry 210, determines an edge node where cache of the content is already present. Upon determining the edge node storing the cache, the transport cost between cache of the content and a requested user location is estimated by determining a number of hops between cache of the content and the requested user location. Further, the edge node selection block 207 uses the transport cost for decision making. The transport cost is determined using link latency, hop count between a user and an edge node, node processing latency.

Further, the SDN controller 205 dynamically determines the node occupancy. The node occupancy is another parameter that goes into the cognitive model. It may be noted that the node occupancy is the sum total of the bandwidth consumption of each of the users 213 associated with an edge node. As will be appreciated, the node occupancy should be less for caching the content since caching the content in an edge node with high node occupancy increases latency for consuming the content. Further, the node occupancy may not be directly proportional to the number of users connected. For example, 5 users consuming a 360° video content may use a higher occupancy compared to 7 users consuming a low quality planar video content. Hence, the node occupancy and the number of users connected to an edge node should be used to improve the accuracy of prediction. The node occupancy for each of the edge node is estimated by a virtual bridge, which may then forward value of the node occupancy to the SDN controller 205.

Further, the SDN controller 205 dynamically determines the RTT and Jitter. It may be noted that the RTT is the time taken by a packet to travel from source to destination and back to the source. It may also be noted that the jitter is a variation in delay of packet reception primarily caused by factors such as network congestion, inefficient queuing, etc. The RTT and jitter are key parameters to estimate the latency in a link between a user requesting the content and the edge node where the cache is present. The RTT and jitter is estimated at a user location and returned to the data collection block 204.

Further, the SDN controller 205 dynamically determines the HRI. The HRI is an amount of hardware resources available in each of the edge nodes 202 to support the caching of the content. The HRI includes system parameters such as, compute power, memory, storage, etc. It may be noted that the HRI is a critical parameter since the edge nodes 202 require high amount of resources to cache and store the content. The HRI is estimated in an edge node and communicated to the data collection block 204.

Further, the SDN controller 205 dynamically determines the interest factor of the content. It may be noted that the Interest factor of the content represents a number of users consuming the content. Interest factor is determined by estimating a number of user sessions consuming the content. Further, the data collection block 204 gathers the HRI of each of the edge nodes 202 under supervision of the data collection block 204. Resource availability on a node is a critical parameter to determine an edge node to cache the content. For example, let there be an edge node, suited to serve content to a set of users in an area. Upon obtaining user matrix information, peak hours of an area are determined. A generic node occupancy and transport cost metric may inadequately assess a requirement of hardware resources needed for caching during the peak hours. During peak hours, there is a requirement for a temporary backup cache node in case resources corresponding to the optimal node resources are exhausted. Further, the data collection block 204 sends edge node, user, and cache related information to the edge node selection block 207. Additionally, the data collection block 204 sends user-node association related parameters to the user-node association block 206.

Figure 6:
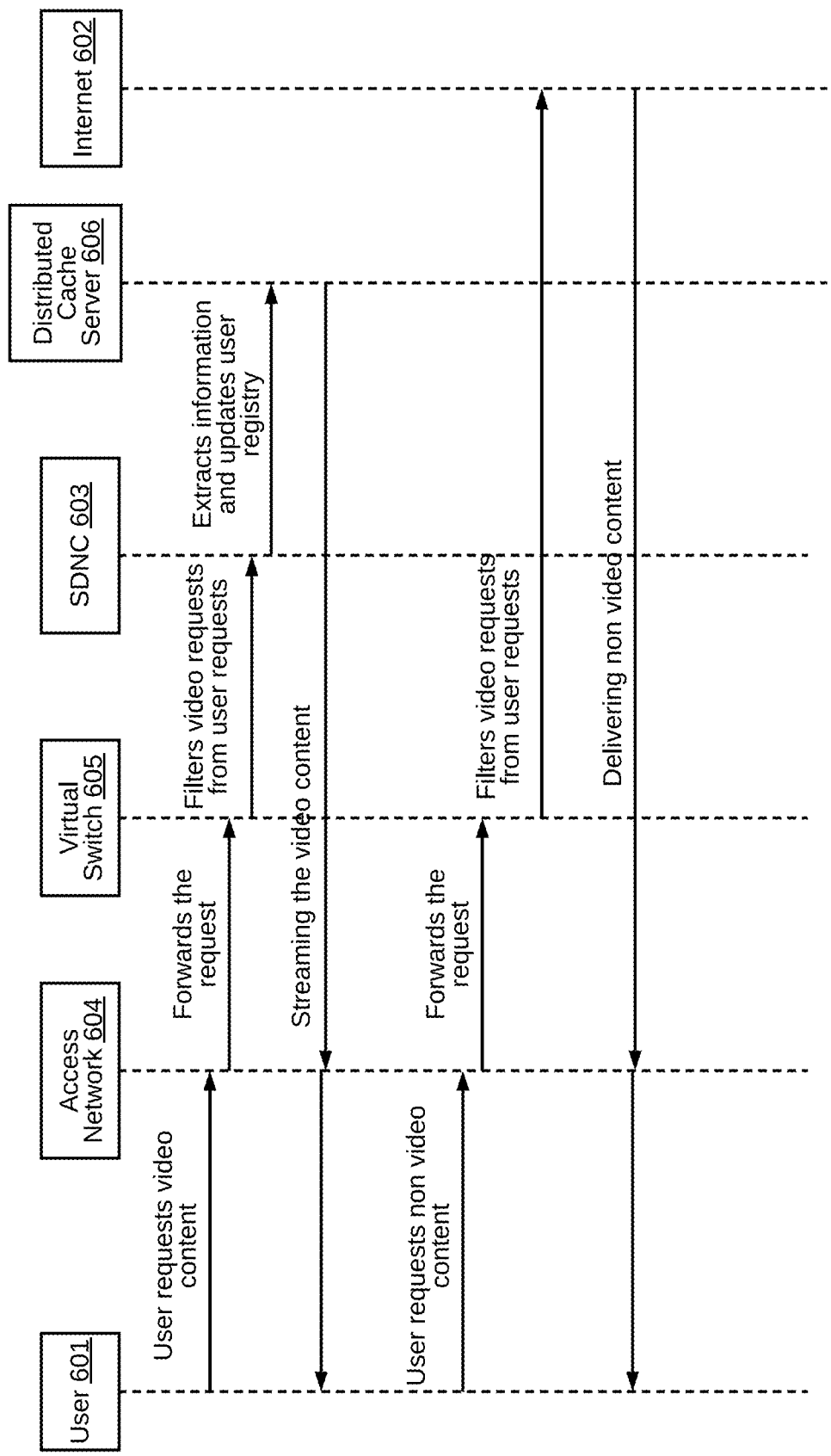
FIG. 6 illustrates data transmission to a user device from internet through a Software-Defined Networking Controller (SDNC), in accordance with some embodiments of the present disclosure.

Referring now to FIG. 6, data transmission to a user 601 from internet 602 through an SON controller 603 is illustrated, in accordance with some embodiments of the present disclosure. In an embodiment, the user 601 sends a user request for video content to an access network 604. Further, the access network 604 forwards the user request to a virtual switch 605. It may be noted that the virtual switch 605 may receive a plurality of user requests. Further, the virtual switch filters video requests from the plurality of user requests and shares the video requests with the SDN controller 603. Further, the SDN controller 603 extracts information and updates user registry (for example, the user registry 208) and forwards the request to DCS 606. In an embodiment, the DCS 606 may be analogous to the DCS 203. Further, the DCS 606 may allow the user 601 to stream the video content through the access network 604.

Alternately, the user 601 sends a user request for non-video content to an access network 604. Further, the access network 604 forwards the user request to a virtual switch 605. It may be noted that the virtual switch 605 may receive a plurality of user requests. Further, the virtual switch filters video requests from the plurality of user requests and shares the non-video requests with directly with the internet 602. It may be noted that the non-video content may not be cached due to smaller file size as compared to the video content. Therefore, the non-video content is delivered by the internet 602 to the user 601.

Referring now to FIG. 5, the process 500 further includes collecting, by the user-node association block 206, user-node association parameters from the data collection block 204 using location service API, at step 502. The user-node association block 206 tracks MEC node association of the users associated to the edge nodes 202. Further, the user-node association block 206 updates the user registry 208 with identities of the users 213 and association of the users 213 with new edge nodes. When a new user is associated with an edge node, the SDN controller 205 automatically discovers the new user and an identity (for example, MAC address) associated with the new user. Further, the user registry 208 checks whether the identity associated with the new user is previously associated with an edge node. When the identity associated with the new user is previously associated with a previous edge node, the user registry 208 is updated with the new edge node for the identity associated with the new user and the node occupancy is re-evaluated for the new edge node and the previous edge node to which the new user was previously associated. Further, the user-node association block 206 shares node association parameters for the edge nodes 202 to the edge node selection block 207. The node association parameters are further described in conjunction with FIG. 7.

Figures 7, 8:
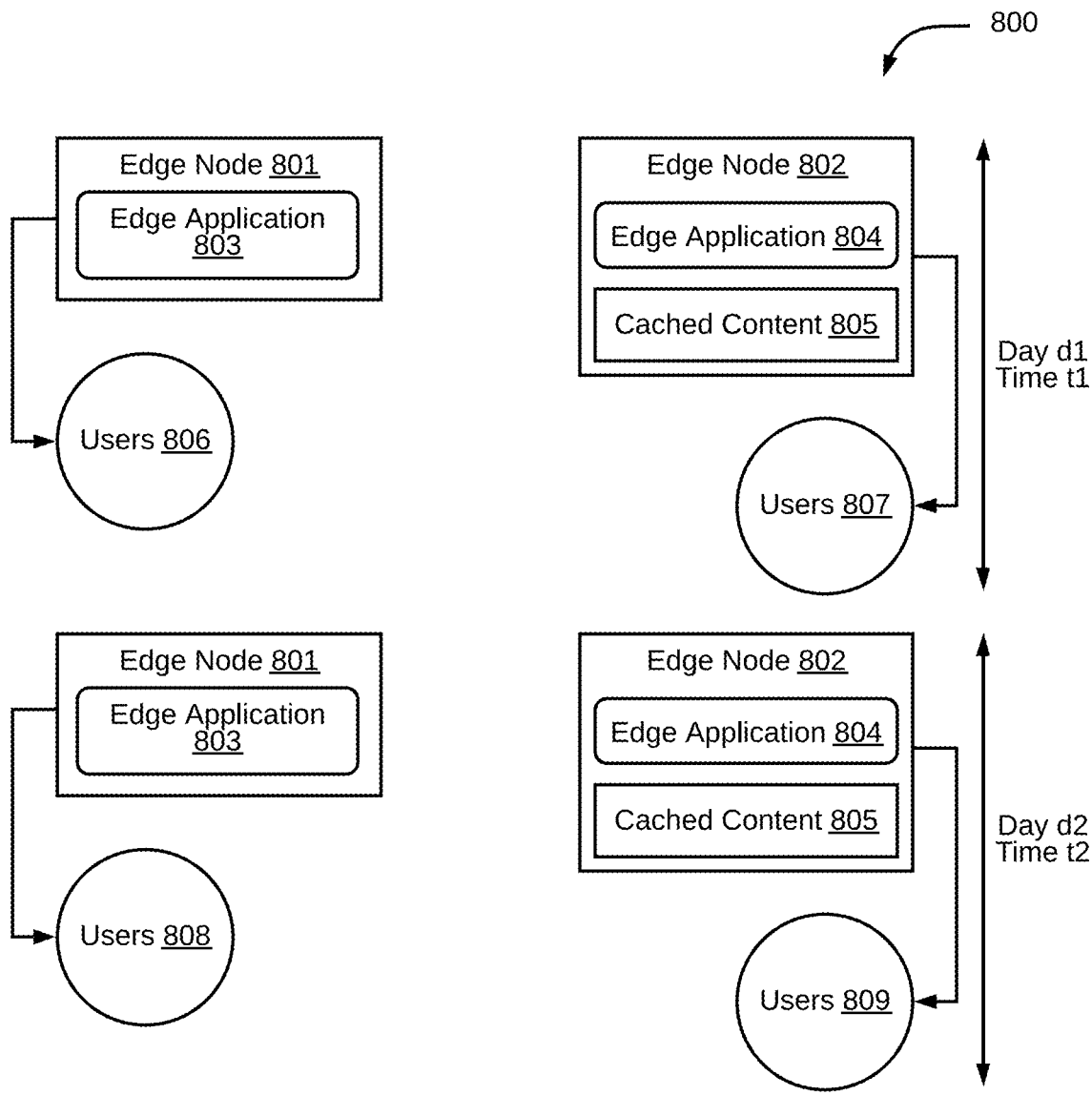
FIG. 7 is an exemplary Mobile Edge Computing (MEC) association matrix, in accordance with some embodiments of the present disclosure.
FIG. 8 illustrates an exemplary user association distribution for a plurality of edge nodes at different time instances, in accordance with some embodiments of the present disclosure.

Referring now to FIG. 7, an exemplary MEC association matrix 700 is illustrated, in accordance with some embodiments of the present disclosure. In an embodiment, the user-node association block 206 shares the node association parameters for the edge nodes 202 to the edge node selection block 207. The MEC association matrix 700 includes columns for user 701, day 702, time 703, and an associated MEC node 704. It may be noted that a user u1 is associated with the edge node N3, on a day d1, and at time instance t1. Similarly, a user u2 is associated with the edge node N4, on a day d2, and at time instance t2. When the node association parameters are captured at a large scale for each of the users 213, the user-node association block 206 detects an overall node association pattern of the users 213 over a period of time and a dynamic node occupancy distribution across MEC nodes. Based on the overall node association pattern and the dynamic node occupancy distribution, the edge node selection block 207 decides to cache the content in a back-up MEC node (for example, N4) with precision, which is closer to an MEC node (for example, N3) storing the cache, since a probability of N3 getting congested at a later point of time due to the user node association pattern is detected by the user-node association block 206.

Referring now to FIG. 5, the process 500 further includes determining, by the edge node selection block 207, requirement for optimal edge node based on user-node association parameters and edge node related parameters, at step 503. The edge node selection block 207 receives user-node association parameters from the user-node association block 206. Further, the edge node selection block 207 receives edge node related parameters from the data collection block 204. Further, the edge node selection block 207 determines, based on user-node association and edge node related parameters, whether to route the user to one of a previous cache location or a nearest available cache location, or whether to initiate content cache in a newly associated edge node.

When the user disassociates from an edge node, the SDN controller 205 automatically detects the disassociation. Further, the SDN controller 205 will also be able to detect the re-association of the same user to another edge node in future as user identity information exists at a central management and orchestration system. Further, the edge node selection block 207 routes the user to a previous cache location or the nearest available cache location using a policy driven flow rule.

When the users 213 (in mobility) re-associate with a new edge node ($N_{new}$), depending on a number of users re-associating, the edge node selection block 207, with help of user-node association block 206 initiates a content caching in the new edge node ($N_{new}$) instead of routing the users 213 to another cache location. Hence, a new cache is initiated by the edge node selection block 207 for the content, when the number of users re-associating exceeds a pre-set threshold ($N_T$).

The edge node selection block 207, based on current metrics (for example, node occupancy, latency, etc.) determines a requirement for an optimal edge node for content caching. However, when user density distribution across the edge nodes 213 changes over time, a top-ranked optimal edge node may be congested based on a number of users associated. This has been discussed in detail in conjunction with FIG. 8.

Referring now to FIG. 8, an exemplary user association distribution 800 for a plurality of edge nodes (for example, the edge node 801 and the edge node 802) at different time instances, in accordance with some embodiments of the present disclosure. The edge node 801 includes an edge application 803 and the edge node 802 includes an edge application 804 and a cached content 805. By way of an example, on a day $d^1$ and at a time instance t1, a number of users 806 associated with the edge node 801 is 1000 and a number of users 807 associated with the edge node 802 is 50. Further, the edge node selection block 207 selects edge node 802 as an optimal node for caching the content based on the current metrics (for example, node occupancy, user density, etc.) on a day $d^1$ and at a time instance t1. However, on a day d2 and at a time instance t2, a number of users 808 associated with the edge node 801 is 20 and a number of users 809 associated with the edge node 802 is 1500. As will be appreciated, the node occupancy and the user density corresponding to the edge node 802 significantly increase. Therefore, a requirement for a new optimal edge node is established and the edge node selection block 207 associates some of the users 809 with the edge node 801.

Further, the edge node selection block 207 receives the user-node association pattern across the edge nodes 202 from the user-node association block 206 to determine the requirement of a new optimal edge node for content caching.

Referring now to FIG. 5, the process 500 includes selecting, by the edge node selection block 207, an optimal edge node to cache the requested content, at step 504. Upon determining the requirement of an optimal edge node for content caching, the edge node selection block 207 selects an optimal edge node to cache the content. It should be noted that when a user requests for a content, caching the content repeatedly at the edge nodes nearest to the user may not always be an efficient option.

The cached content may not be consumed by a large number of users in a particular area. When number of access requests originating from a particular edge location is less, the users 213 may be routed to a remote edge node, where the content is already cached, for consuming the content, instead of caching at the nearest edge node. It may be noted that the processing and redundancy of the content may be significantly reduced by routing the users 213 to a remote edge node. Additionally, the node occupancy of the nearest edge node to the user may be high compared to neighboring edge nodes and may cause congestion in the network when the content is cached at a highly occupied node, leading to poor user experience.

It may be noted that the edge node selection block 207 leverages an ML model to make an intelligent decision of hierarchical content caching. The edge node selection block 207 collects metrics such as, the user density (number of users connected), the transport cost, the node occupancy, and the like, from the data collection block 204. Further, the edge node selection block 207 sends the metrics and the node association related parameters to an ML model to predict the optimal edge node for caching the content. This has been discussed in detail in conjunction with FIG. 9 and FIG. 10.

Figures 9, 10:
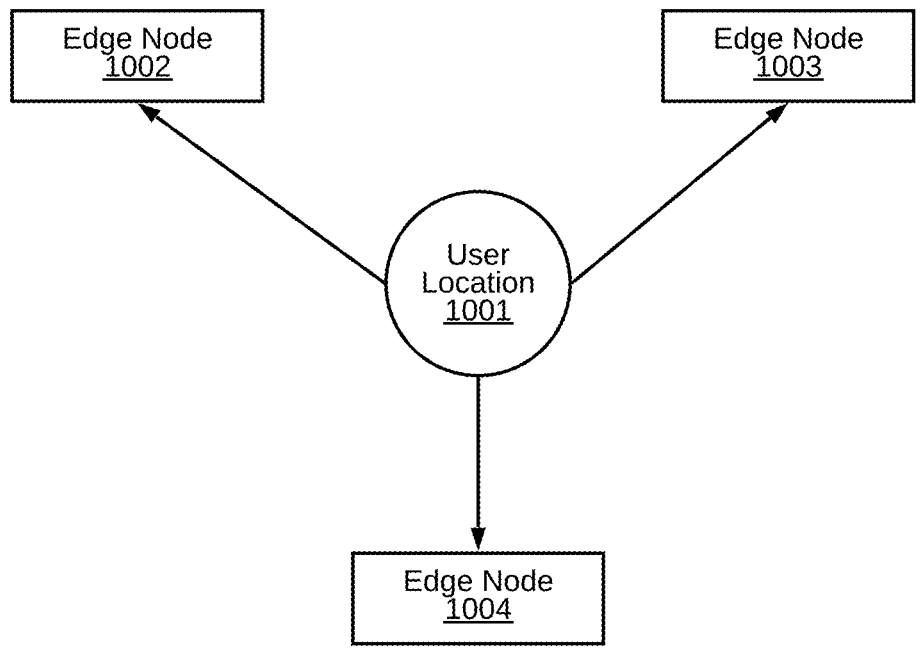
FIG. 9 is an exemplary table showing prediction of an edge node for content caching, in accordance with some embodiments of the present disclosure.
FIG. 10 illustrates location of optimal edge nodes with respect to a user location, in accordance with some embodiments of the present disclosure.

Referring now to FIG. 9, an exemplary table 900 showing prediction of an edge node for content caching is shown, in accordance with some embodiments of the present disclosure. The table 900 includes the metrics and the node association related parameters (for example, number of users associated 901, number of hops 902, node occupancy 903, and RTT 904). Further, the edge node selection block 207 sends the metrics and the node association related parameters to an ML model to predict the optimal edge node for caching 905. In an exemplary scenario, the metrics and the node association related parameters may include 50 number of users associated 901, 2 number of hops 902, 70 Mbps node occupancy 903, and 20 ms RTT 904. In such a scenario, the ML model may predict node 1 as the optimal edge node for caching 905.

Referring now to FIG. 10, location of optimal edge node with respect to a user location 1001 is illustrated, in accordance with some embodiments of the present disclosure. It may be noted that an edge node 1002, an edge node 1003, and an edge node 1004 are in proximity to the user location 1001. The user location 1001 may be a location of user devices sending a content request. By way of an example, the edge node 1002 may include parameters such as 3 number of hops, [3 ms, 4 ms, 2 ms] link latency, 50 Mbps link occupancy, 5 ms node processing delay, and 5 ms average jitter. The edge node 1003 may include parameters such as 2 number of hops, [7 ms, 3 ms] link latency, etc. The edge node 1004 may include parameters such as 4 number of hops, [2 ms, 3 ms, 5 ms, 4 ms] link latency, etc. In an embodiment, the edge node selection block 207 identifies the optimal edge node for content caching based on number of hops, link latency between a user and an edge node, jitter, and link occupancy. Further, the edge node selection block 207 estimates the optimal edge node through an optimal combination of minimum link latency, link occupancy, delay, and jitter. In continuation of the example above, the edge node selection block 207 may predict the edge node 1002 as the optimal edge node. Upon selecting the optimal edge node for content caching, the edge node selection block 207 notifies the optimal edge node to cache the content. Further, the edge node selection block 207 provides location of the DCS from where the content is to be cached.

Referring now to FIG. 5, the process 500 further includes modifying, by the cache management block 209, the cache content in the selected edge node based on the demand and validity of the cached content, at step 505. Upon caching the content in the optimal edge node, the cache management block 209 updates the cache registry 210. In addition to location of the edge cache where the content is available, the cache registry 210 stores a timestamp of the content and a TTL. It should be noted that the content is cleared from the DCS upon completing the TTL. Further, the cache management block 209 uses a plurality of metrics to determine whether the content is relevant to the users, such as interest factor of the content, etc. Upon deleting the cache, recovery of the cache is achieved from the DCS, when requested in future.

The cache management block 209 assigns TTL based on size of the initial content, interest factor, and number of cache locations. It may be noted that when the file size is large, the TTL given is more, since the file may require more resources to re-establish the cache. Further, during initial caching, when the demand of the content is more, the content is given a greater TTL. Further, the cache registry 210 maintains a record of each cache location. When the content is cached elsewhere or in multiple locations, the content is given less TTL.

Each of the size of the initial content, the interest factor, and the number of cache locations contribute to the decision of a TTL to be assigned to a cached content. In some embodiments, the ML models of the edge node selection block 207 may be fine-tuned based on weightages of each of the size of the initial content, the interest factor, and the number of cache locations. This is discussed in detail in conjunction with FIG. 11 and FIG. 12.

Figure 11:
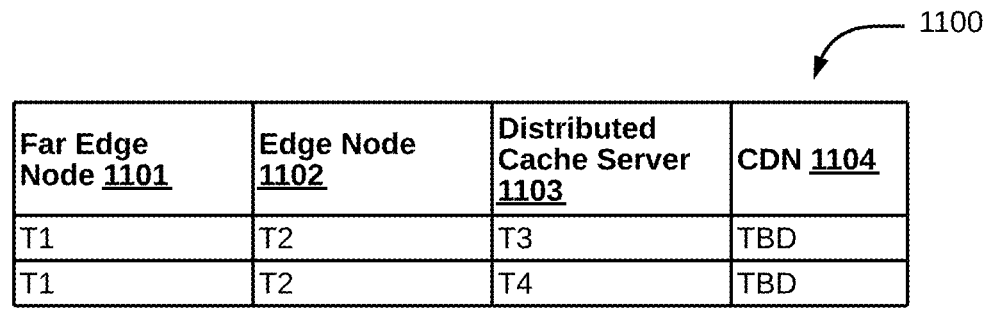
FIG. 11 is an exemplary table showing a Time to Live (TTL) at each level of a hierarchical arrangement of nodes for content caching, in accordance with some embodiments of the present disclosure.

Referring now to FIG. 11, an exemplary table 1100 showing a TTL at each level of a hierarchical arrangement of nodes for content caching is shown, in accordance with some embodiments of the present disclosure. The table 1100 includes a TTL for each of a far edge node 1101, an edge node 1102, a DCS 1103, and a CDN 1104. In an exemplary scenario, for a far edge node in a hierarchical arrangement of nodes, the TTL may be T1. Upon completing T1, the cache may be compressed and moved to an edge node in an upper tier connected to the far edge node. For the edge node connected with the far edge node, the TTL assigned for the cache may be T2. It should be noted that T1>T2. Further, upon completing T1, the cache may be compressed and moved to a DCS in an upper tier connected to the edge node. For the DCS connected with the edge node, the TTL may be T3. It should be noted that T2>T3.

Figure 12:
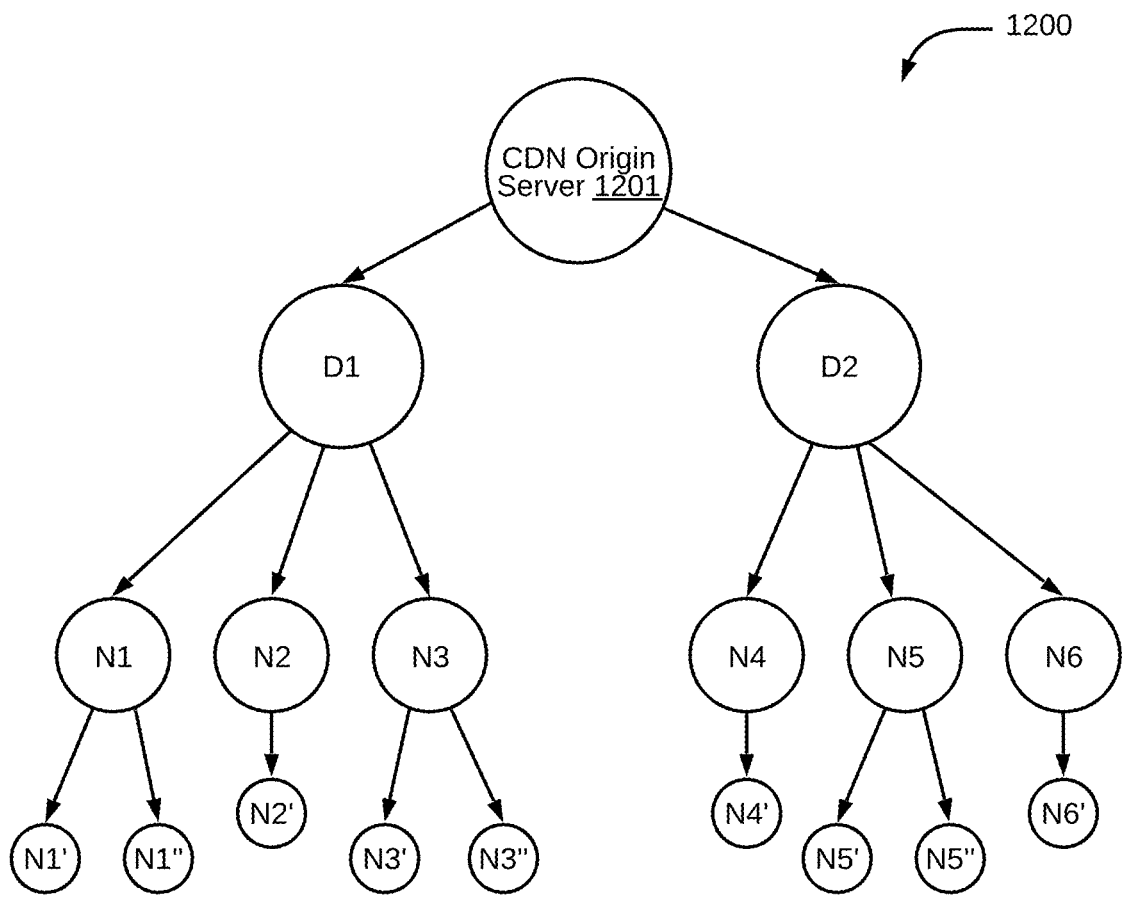
FIG. 12 illustrates a topology of a hierarchical arrangement of nodes for content caching, in accordance with some embodiments of the present disclosure.

Referring now to FIG. 12, a topology 1200 of a hierarchical arrangement of nodes for content caching is illustrated, in accordance with some embodiments of the present disclosure. The hierarchical arrangement includes far edge nodes (for example, far edge node N1' and a far edge node N1"), edge nodes (for example, edge node N1), DCSs (for example, D1), and a CDN origin server (for example, CDN origin server 1201). During content caching, the cache management block 209 stores the TTL. By way of an example, a TTL of $T_1$ is given to the cached content at the far edge node N1'. The far edge node N1' is connected to the edge node N1. In some embodiments, the far edge node N1" may be connected to the edge node N1. In such embodiments, the far edge node N1' and the far edge node N1" are peer far edge nodes.

Further, the cache management block 209 performs a query procedure for assigning TTL. The cache management block 209 queries for the interest factor of the content in the far edge node N1'. When the interest factor for the content in the far edge node N1' is above a predefined threshold, but less than an original interest factor at a time of cache creation, the cache management block 209 may provide a lesser TTL, say T1'.

Further, the cache management block 209 queries for the interest factor of the content at a far edge level. When the interest factor for the content in peer far edge node, N1" is high, the cache management block 209 may delete the cache from N1' and create a cache in the edge node N1, assuming there is a content cache in the far edge node N1".

Further, the cache management block 209 queries for the interest factor of the content in the far edge level. When the interest factor for the content is negligible at a time instance of TTL expiry in each of the far edge nodes of an edge node N1, the cache management block 209 deletes the cache in each of the far edge node N1' and the far edge node N1" and compresses the cache present at the edge node N1 to save bandwidth, if the cache is to be created at the far edge nodes again.

Similarly, at the time instance of TTL expiry of the compressed cache at the edge node N1, the cache management block 209 queries peer edge nodes and the distributed cache servers for presence of the cache content. At each point in the hierarchy, the cache management block 209 checks for the cache content interest factor at (n−1) and (n−2) level, where n is the far edge level, to decide on a suitable level for mitigating the cache. Further, at a final stage, the content may be retrieved from the CDN origin server 1201. Upon moving the content to an upper hierarchy level of the hierarchical arrangement, a TTL of $T_2$ is given to the content ($T_1$>$T_2$), and so on, for upper tier cache. The cache registry 210 continuously polls for the TTL and location data of each cache content.

Further, the cache management block 209 notifies the edge nodes 202 upon updating or amending the original content. Subsequently, each of copies of the content is replaced with updated content. For example, the DCS detects a change in the content being streamed by original distributed cache server and notifies each of the edge nodes 202 and the users 213 of a change in the content. Further, the DCS detects locations where the content is cached and in use. The control server may send the updated content to the edge nodes 202.

Figure 13:
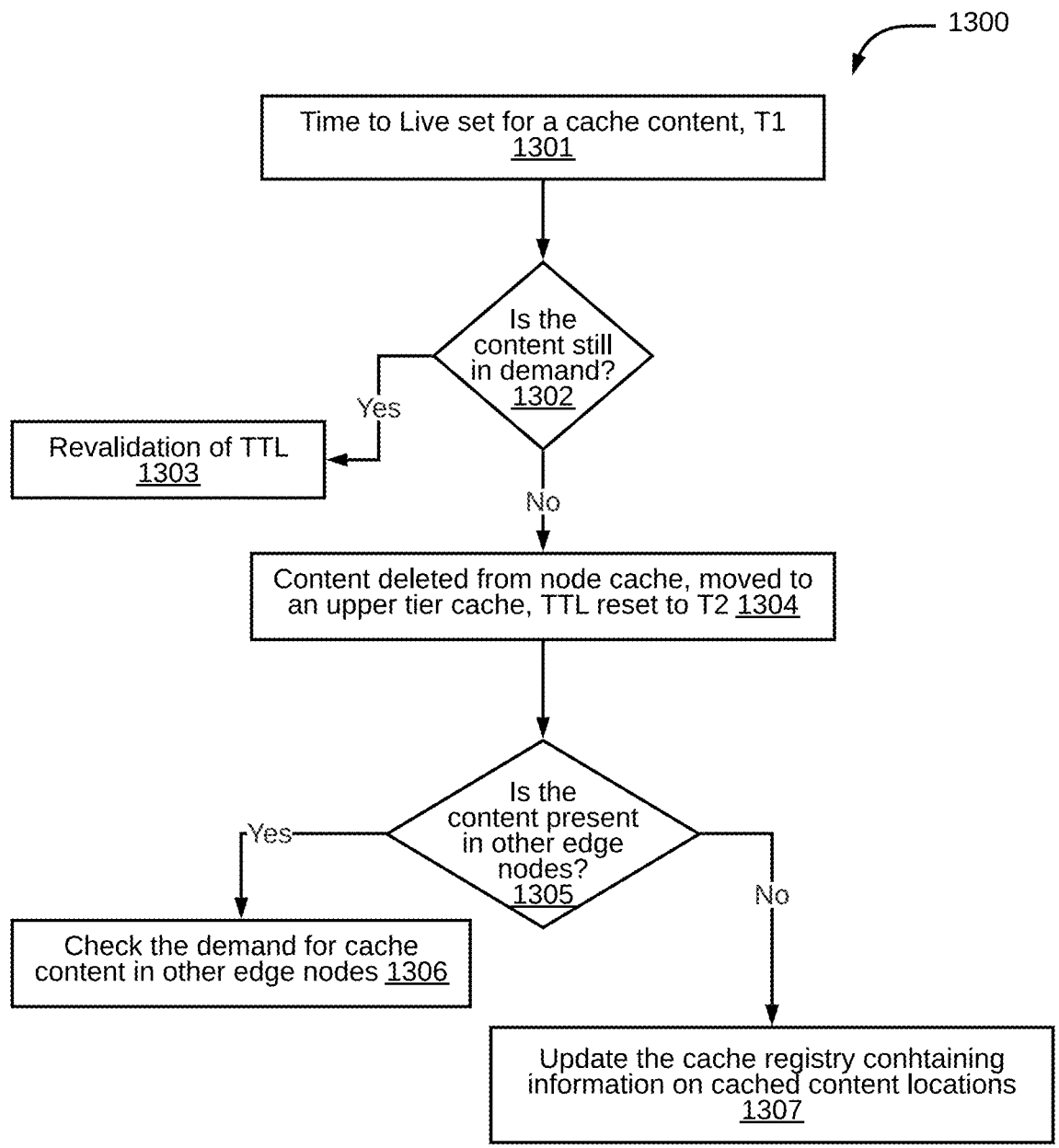
FIG. 13 illustrates a flow diagram of a detailed exemplary process for managing a TTL in a hierarchical arrangement of nodes for content caching, in accordance with some embodiments of the present disclosure.

Referring now to FIG. 13, a detailed exemplary process 1300 for managing a TTL in a hierarchical arrangement of nodes for content caching is depicted via a flowchart, in accordance with some embodiments of the present disclosure. In an embodiment, the process 1300 may be implemented by the system 200. The process 1300 may include setting the TTL (for example, time T1) for a cached content, at step 1301. Further, at step 1302 of the process 1300, a check is performed to determine whether the content is still in demand. When the content is in demand, the process 1300 includes revalidation of the TTL, at step 1303. When the content is not in demand, the process 1300 includes deleting the content from node cache, moving the content to an upper tier cache, and resetting the TTL to T2, at step 1304. Further, a check is performed at step 1305 to determine whether the content is present in other edge nodes. When the content is present in other edge nodes, the process 1300 includes checking the demand for cache content in other edge nodes, at step 1306. When the content is not present in other edge nodes, the process 1300 includes updating the cache registry containing information on cached content locations, at step 1307.

Figure 14:
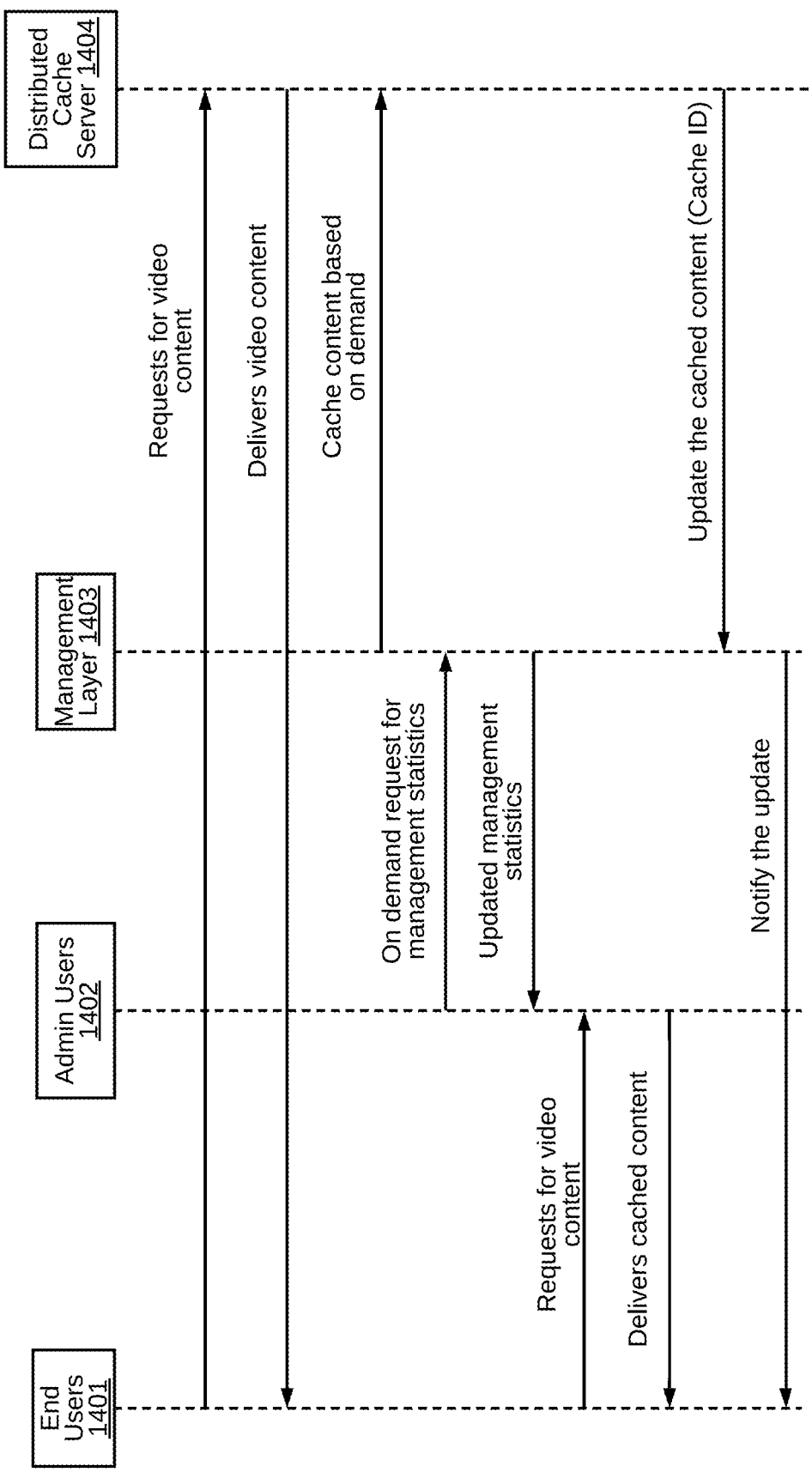
FIG. 14 illustrates cache updation through a distributed cache server, in accordance with some embodiments of the present disclosure.

Referring now to FIG. 14, cache updation through a distributed cache server is illustrated, in accordance with some embodiments of the present disclosure. Each of end users 1401, admin users 1402, management layer 1403 may stream video content from the DCS 1404 with varying set of privileges. The end users 1401 request the DCS 1404 for the video content. The DCS 1404 delivers the video content to the end users 1401. Additionally, the admin users 1402 may obtain updated management statistics from the management layer 1403 on-demand for a cached content without refreshing the video content and save bandwidth for the end users 1401 since refresh of management statistics takes lesser bandwidth compared to refreshing the video content. By way of an example, the management statistics may include the number of views to the video content. Further, cache of the video content may be delivered to the end users 1401 from the admin users 1402. When the cached content is updated, the DCS 1404 updates the cached content in the management layer 1403. Further, the management layer 1403 notifies the update to the end users 1401.

Referring now to FIG. 5, the process 500 further includes updating, by the cache management block 209, the cache registry 210 based on the modified cache data, at step 506. Upon updating the edge cache of the edge nodes 202, the cache management block 209 updates the cache registry 210. Further, the cache management block monitors the cache registry 210 after a pre-defined time for updating the cache locations to provide the updated or modified content to the edge user on request.

Figure 15:
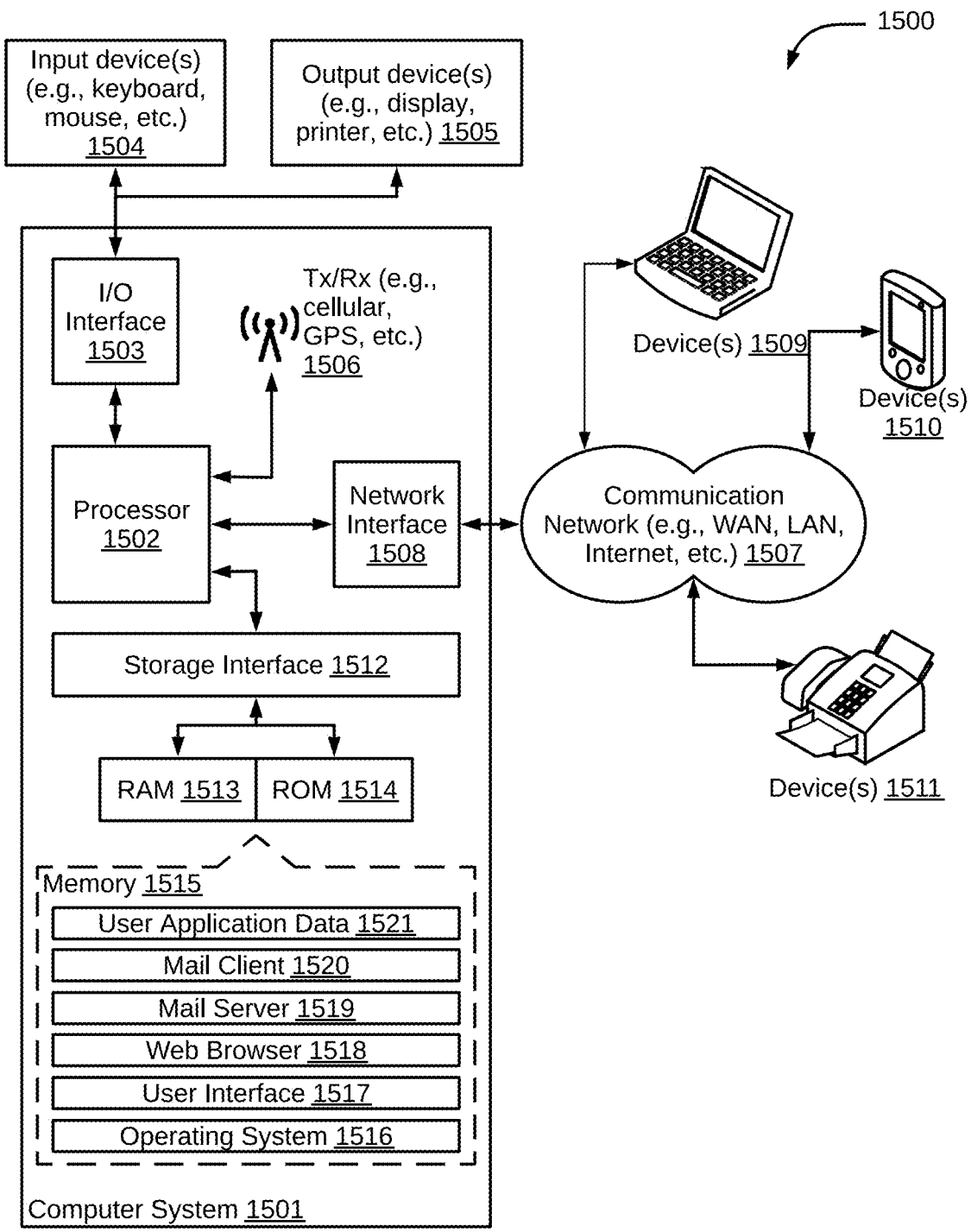
FIG. 15 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 15, a block diagram of an exemplary computer system 1501 for implementing embodiments consistent with the present disclosure is illustrated. Variations of computer system 1501 may be used for implementing system 100 for certificate-less security management of interconnected hybrid resources. Computer system 1501 may include a central processing unit ("CPU" or "processor") 1502. Processor 1502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1502 may be disposed in communication with one or more input/output (I/O) devices via I/O interface 1503. The I/O interface 1503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1503, the computer system 1501 may communicate with one or more I/O devices. For example, the input device 1504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1505 may be a printer, fax machine, video display (e.g., cathode ray tube (CRT), liquid crystal display (LCD), light-emitting diode (LED), plasma, or the like), audio speaker, etc. In some embodiments, a transceiver 1506 may be disposed in connection with the processor 1502. The transceiver 1506 may facilitate various types of wireless transmission or reception. For example, the transceiver 1506 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1502 may be disposed in communication with a communication network 1508 via a network interface 1507. The network interface 1507 may communicate with the communication network 1508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1508 may include, without limitation, a direct interconnection, local area network (LAN), wide area network (WAN), wireless network (e.g., using Wireless Application Protocol), the Internet, etc. Using the network interface 1507 and the communication network 1508, the computer system 1501 may communicate with devices 1509, 1510, and 1511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1501 may itself embody one or more of these devices.

In some embodiments, the processor 1502 may be disposed in communication with one or more memory devices (e.g., RAM 1513, ROM 1514, etc.) via a storage interface 1512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1516, user interface application 1517, web browser 1518, mail server 1519, mail client 1520, user/application data 1521 (e.g., any data variables or data records discussed in this disclosure), etc. The operating system 1516 may facilitate resource management and operation of the computer system 1501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1517 may facilitate display, execution, interaction, manipulation, or operation of program components through textual or graphical facilities. For example, user interfaces may provide computer interaction interface elements on a display system operatively connected to the computer system 1501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1501 may implement a web browser 1518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1501 may implement a mail server 1519 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1501 may implement a mail client 1520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1501 may store user/application data 1521, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of managing cache data in a network through edge nodes. The method and system provide for identifying the optimal edge node to cache the content, taking into consideration the occupancy at each base station, association of the users, transport cost and other metrics. Hence, the method and system offload computing to the edge nodes rather than the mobile devices of the end users. Further, the method and system consider various metrics and circulate the content to various tiers in a multi-tier hierarchical caching system. Thus, the method and system handle the distribution of cache amongst various caches. Further, the method and system consider the network conditions of the target locations, resource availability in the target edge node, occupancy levels, etc., to decide on the most optimal node for content caching. Thus, the edge node bandwidth is enhanced which enhances utilization of computational capability of the edge node.

As will be appreciated by those skilled in the art, the techniques described in the various embodiments discussed above are not routine, or conventional, or well understood in the art. The techniques discussed above provide for managing cache data in a network through edge nodes. The techniques first receive a set of first node parameters corresponding to a first edge node from a plurality of edge nodes in the network, a set of Mobile Edge Computing (MEC) node association metrics corresponding to a user device, and a set of data request parameters from the user device. The first edge node is associated with the user device to store the cache data for the user device. The techniques may then identify a variation in at least one of the set of first node parameters corresponding to a first edge node, the set of MEC node association metrics corresponding to a user device, and the set of data request parameters from the user device. The techniques may then select a second edge node from the plurality of edge nodes to store the cache data based on a set of second node parameters corresponding to the second edge node, the set of MEC node association metrics, and the set of data request parameters, when the variation is above a predefined threshold. The techniques may then associate the selected second edge node with the user device to store the cache data for the user device. The second edge node is initiated with the cache data when the cache data is absent in the second edge node prior to the associating. The techniques may then dynamically manage the cache data for the user device in the associated second edge node.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described system and method for managing cache data in a network through edge nodes. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing cache data in a network through edge nodes, the method comprising:
   receiving, by an edge node selection device, a set of first node parameters corresponding to a first edge node from a plurality of edge nodes in the network, a set of Mobile Edge Computing (MEC) node association metrics corresponding to a user device, and a set of data request parameters from the user device, wherein the first edge node is associated with the user device to store the cache data for the user device;
   identifying, by the edge node selection device, a variation in at least one of the set of first node parameters corresponding to a first edge node, the set of MEC node association metrics corresponding to a user device, and the set of data request parameters from the user device;
   selecting, by the edge node selection device, a second edge node from the plurality of edge nodes to store the cache data based on a set of second node parameters corresponding to the second edge node, the set of MEC node association metrics, and the set of data request parameters, when the variation is above a predefined threshold;
   associating, by the edge node selection device, the selected second edge node with the user device to store the cache data for the user device, wherein the second edge node is initiated with the cache data when the cache data is absent in the second edge node prior to the associating; and
   dynamically managing, by the edge node selection device, the cache data for the user device in the associated second edge node.

2. The method of claim 1, wherein the network comprises a hierarchical arrangement of the plurality of edge nodes, a plurality of nodes, a set of distributed cache servers, and a Content Delivery Network (CDN) origin server.

3. The method of claim 2, wherein dynamically managing the cache data for the user device in the second edge node further comprises:
   calculating a weightage for each of the set of data request parameters through a predictive model, wherein the set of data request parameters comprises an interest factor associated with the cache data of the second edge node, initial cache size, and number of edge locations storing the cache data;
   calculating a first Time to Live (TTL) of the cache data corresponding to the second edge node based on the weightage of each of the set of data request parameters through the predictive model; and
   storing a timestamp, the set of data request parameters, and the first TTL of the cache data corresponding to the second edge node in a cache repository.

4. The method of claim 3, further comprising assigning a second TTL to the cache data corresponding to the second edge node through the predictive model upon completing the first TTL, when the weightage changes over the first TTL, wherein the second TTL is lower than the first TTL when the weightage decreases over the first TTL, and wherein the second TTL is greater than the first TTL when the weightage increases over the first TTL.

5. The method of claim 3, further comprising:
   deleting the cache data from the second edge node when the weightage is below a predefined threshold upon completing the first TTL;
   creating compressed cache data in a node associated with the second edge node, wherein the node is one of the plurality of nodes; and
   assigning a third TTL to the compressed cache data corresponding to the node through the predictive model.

6. The method of claim 2, further comprising:
   identifying a change in source data of the cache data;
   identifying a set of entities storing the cache data in the network, wherein the set of entities is a subset of the plurality of edge nodes, the plurality of nodes, the set of distributed cache servers, and the CDN origin server; and
   initiating an update to the cache data in each of the set of entities based on the change in the source data.

7. The method of claim 1, further comprising:
   estimating a next MEC association location of the user device through a predictive model based on the set of MEC node association metrics; and
   determining the variation in the set of second node parameters and the set of MEC node association metrics through the predictive model based on the next MEC association location of the user device.

8. The method of claim 1, wherein the set of first node parameters and the set of second node parameters comprise edge node occupancy, Hardware Resource Information (HRI) of a corresponding edge node, and a current location of the corresponding edge node, wherein the set of MEC node association metrics comprises a current location, historical location data, and the estimated next location corresponding to the user device, and wherein the set of data request parameters comprises a Round Trip Time (RTT), a jitter, an interest factor, and a transport cost associated with a data request.

9. A system for managing cache data in a network through edge nodes, the system comprising:
   a processor; and
   a memory communicatively coupled to the processor, wherein the memory stores processor instructions, which when executed by the processor, cause the processor to:
      receive a set of first node parameters corresponding to a first edge node from a plurality of edge nodes in the network, a set of Mobile Edge Computing (MEC) node association metrics corresponding to a user device, and a set of data request parameters from the user device, wherein the first edge node is associated with the user device to store the cache data for the user device;
      identify a variation in at least one of the set of first node parameters corresponding to a first edge node, the set of MEC node association metrics corresponding to a user device, and the set of data request parameters from the user device;
      select a second edge node from the plurality of edge nodes to store the cache data based on a set of second node parameters corresponding to the second edge node, the set of MEC node association metrics, and the set of data request parameters, when the variation is above a predefined threshold;
      associate the selected second edge node with the user device to store the cache data for the user device, wherein the second edge node is initiated with the cache data when the cache data is absent in the second edge node prior to the associating; and dynamically manage the cache data for the user device in the associated second edge node.

10. The system of claim 9, wherein the network comprises a hierarchical arrangement of the plurality of edge nodes, a plurality of nodes, a set of distributed cache servers, and a Content Delivery Network (CDN) origin server.

11. The system of claim 10, wherein to dynamically manage the cache data for the user device in the second edge node, the processor instructions, on execution, further cause the processor to:

calculate a weightage for each of the set of data request parameters through a predictive model, wherein the set of data request parameters comprises an interest factor associated with the cache data of the second edge node, initial cache size, and number of edge locations storing the cache data;

calculate a first Time to Live (TTL) of the cache data corresponding to the second edge node based on the weightage of each of the set of data request parameters through the predictive model; and store a timestamp, the set of data request parameters, and the first TTL of the cache data corresponding to the second edge node in a cache repository.

12. The system of claim 11, wherein the processor instructions, on execution, further cause the processor to assign a second TTL to the cache data corresponding to the second edge node through the predictive model upon completing the first TTL, when the weightage changes over the first TTL, wherein the second TTL is lower than the first TTL when the weightage decreases over the first TTL, and wherein the second TTL is greater than the first TTL when the weightage increases over the first TTL.

13. The system of claim 11, further comprising:

delete the cache data from the second edge node when the weightage is below a predefined threshold upon completing the first TTL;

create compressed cache data in a node associated with the second edge node, wherein the node is one of the plurality of nodes; and assign a third TTL to the compressed cache data corresponding to the node through the predictive model.

14. The system of claim 10, wherein the processor instructions, on execution, further cause the processor to:

identify a change in source data of the cache data;

identify a set of entities storing the cache data in the network, wherein the set of entities is a subset of the plurality of edge nodes, the plurality of nodes, the set of distributed cache servers, and the CDN origin server; and initiate an update to the cache data in each of the set of entities based on the change in the source data.

15. The system of claim 9, wherein the processor instructions, on execution, further cause the processor to:

estimate a next MEC association location of the user device through a predictive model based on the set of MEC node association metrics; and determine the variation in the set of second node parameters and the set of MEC node association metrics through the predictive model based on the next MEC association location of the user device.

16. The system of claim 9, wherein the set of first node parameters and the set of second node parameters comprise edge node occupancy, Hardware Resource Information (HRI) of a corresponding edge node, and a current location of the corresponding edge node, wherein the set of MEC node association metrics comprises a current location, historical location data, and the estimated next location corresponding to the user device, and wherein the set of data request parameters comprises a Round Trip Time (RTT), a jitter, an interest factor, and a transport cost associated with a data request.

17. A non-transitory computer-readable medium storing computer-executable instructions for managing cache data in a network through edge nodes, the computer-executable instructions configured for:

receiving a set of first node parameters corresponding to a first edge node from a plurality of edge nodes in the network, a set of Mobile Edge Computing (MEC) node association metrics corresponding to a user device, and a set of data request parameters from the user device, wherein the first edge node is associated with the user device to store the cache data for the user device;

identifying a variation in at least one of the set of first node parameters corresponding to a first edge node, the set of MEC node association metrics corresponding to a user device, and the set of data request parameters from the user device;

selecting a second edge node from the plurality of edge nodes to store the cache data based on a set of second node parameters corresponding to the second edge node, the set of MEC node association metrics, and the set of data request parameters, when the variation is above a predefined threshold;

associating the selected second edge node with the user device to store the cache data for the user device, wherein the second edge node is initiated with the cache data when the cache data is absent in the second edge node prior to the associating; and dynamically managing the cache data for the user device in the associated second edge node.

18. The non-transitory computer-readable medium of claim 17, wherein the network comprises a hierarchical arrangement of the plurality of edge nodes, a plurality of nodes, a set of distributed cache servers, and a Content Delivery Network (CDN) origin server.

19. The non-transitory computer-readable medium of claim 18, wherein for dynamically managing the cache data for the user device in the second edge node, the computer-executable instructions are further configured for:

calculating a weightage for each of the set of data request parameters through a predictive model, wherein the set of data request parameters comprises an interest factor associated with the cache data of the second edge node, initial cache size, and number of edge locations storing the cache data;

calculating a first Time to Live (TTL) of the cache data corresponding to the second edge node based on the weightage of each of the set of data request parameters through the predictive model; and storing a timestamp, the set of data request parameters, and the first TTL of the cache data corresponding to the second edge node in a cache repository.

20. The non-transitory computer-readable medium of claim 19, wherein the computer-executable instructions are further configured for assigning a second TTL to the cache data corresponding to the second edge node through the predictive model upon completing the first TTL, when the weightage changes over the first TTL, and wherein the second TTL is lower than the first TTL when the weightage decreases over the first TTL, and wherein the second TTL is greater than the first TTL when the weightage increases over the first TTL.

* * * * *